US009160488B2

(12) United States Patent
Jeon et al.

(10) Patent No.: US 9,160,488 B2
(45) Date of Patent: Oct. 13, 2015

(54) APPARATUS AND METHOD FOR COMPENSATING OUTPUT SIGNALS OF MAGNETIC ENCODER USING DIGITAL PHASE-LOCKED LOOP

(71) Applicant: Research & Business Foundation SUNGKYUNKWAN UNIVERSITY, Suwon-si (KR)

(72) Inventors: Jae Wook Jeon, Seoul (KR); Seong Jin Cho, Suwon-si (KR); Hoang Van Hung, Suwon-si (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 14/340,801

(22) Filed: Jul. 25, 2014

(65) Prior Publication Data

US 2015/0030104 A1  Jan. 29, 2015

(30) Foreign Application Priority Data

Jul. 26, 2013 (KR) .................... 10-2013-0089183

(51) Int. Cl.
  *H03D 3/24* (2006.01)
  *H04L 1/00* (2006.01)
  *G01P 3/487* (2006.01)

(52) U.S. Cl.
  CPC .............. *H04L 1/0042* (2013.01); *G01P 3/487* (2013.01)

(58) Field of Classification Search
  CPC .... H04L 1/0041; H04L 1/0042; H04L 1/0072; H04L 1/009; H04L 1/205
  See application file for complete search history.

(56) References Cited

U.S. PATENT DOCUMENTS

| 5,459,757 A | * | 10/1995 | Minuhin et al. | 375/376 |
| 2011/0309824 A1 | * | 12/2011 | Takahashi et al. | 324/207.13 |
| 2014/0155098 A1 | * | 6/2014 | Markham et al. | 455/456.3 |

* cited by examiner

*Primary Examiner* — Dac Ha
(74) *Attorney, Agent, or Firm* — NSIP Law

(57) ABSTRACT

An apparatus and method for compensating output signals of a magnetic encoder are disclosed. The apparatus includes a pre-calibration unit, an advanced phase detector, a loop filter, a voltage controlled oscillator (VCO), and a pulse generator. The pre-calibration unit obtains two phase-compensated waveforms through trigonometric function operations, and adjusts the amplitudes of the two phase-compensated waveforms to the same value, thereby generating input sine and cosine waves. The advanced phase detector generates an error output signal through trigonometric function operations. The loop filter sets the filter transfer function of an active lead-lag filter, and then filters the error output signal. The VCO generates a compensated signal. The pulse generator outputs a phase index, and generates two output pulses having a phase difference of 90 degrees in accordance with a pulse generation rule of a look-up table.

19 Claims, 8 Drawing Sheets

APPARATUS AND METHOD FOR COMPENSATING OUTPUT SIGNALS OF MAGNETIC ENCODER USING DIGITAL PHASE-LOCKED LOOP

CROSS-REFERENCE TO RELATED APPLICATION(S)

This application claims the benefit under 35 USC 119(a) of Korean Patent Application No. 10-2013-0089183 filed on Jul. 26, 2013, in the Korean Intellectual Property Office, the entire disclosure of which is incorporated herein by reference for all purposes.

BACKGROUND OF THE INVENTION

1. Field of the Invention

The present invention relates generally to a magnetic encoder and, more particularly, to technology for compensating output signals of a magnetic encoder.

2. Description of the Related Art

In various industrial fields, sensors for detecting the rotational angular velocity and location of a rotating object are required. For this purpose, an optical encoder and a magnetic encoder are chiefly used.

An optical encoder has slots rotating in synchronization with a rotating object and passing between an optical source such as laser and an optical receiver, and can generate output signals for detecting the rotational angular velocity and rotational position of an object. The output signal is a pulse train, thus rotational angular velocity and rotational position can be relatively accurately detected by counting pulses and using the number of pulses per hour, and relatively high rotating speeds can be detected. However, the optical encoder is vulnerable to a change in temperature and dust, cannot be easily fabricated in a small size, and is expensive.

In contrast, a magnetic encoder can generate an output signal for detecting the rotational angular velocity and rotational position of a rotating object using induced voltage that is induced by a piece of magnetic material rotating in synchronization with a rotating object. Accordingly, the magnetic encoder, having a relatively simple configuration, is less sensitive to varying temperature and dust occurring in operating environment, and can be fabricated in a small size.

An output signal from the magnetic encoder are composed of a pair of sinusoidal waves: a sine wave and a cosine wave, which are based upon the induced voltage of a rotating magnetic field. A rotational position and a rotational speed can be detected based upon the phases of the two waveforms. However, although the magnetic encoder is inexpensive, two output signals of the magnetic encoder have low resolution because they are vulnerable to noise, phase drift, DC offset, amplitude variation, and waveform distortion.

Recently, there have been several attempts to achieve level of precision of the optical encoders, from the magnetic encoders, having low cost to make and decent mechanical performance, by compensating output signals of the much less expensive magnetic encoders and converting the compensated output signals into a pulse train, as from the optical encoders.

For example, a method using a Kalman filter widely used to eliminate noise from sampling data in a high noise environment, or a method using an observer has been proposed, but a problem arises in that phase drift is unsolvable or an excessive time is required to settle.

SUMMARY OF THE INVENTION

Accordingly, the present invention has been made to address the above problems occurring in the prior art, and an object of the present invention is to provide an apparatus and method for compensating output signals of a magnetic encoder using a digital phase-locked loop (PLL) in order to perform rapid and accurate compensation.

In accordance with an aspect of the present invention, there is provided an apparatus for compensating output signals of a magnetic encoder, including a pre-calibration unit configured to obtain two phase-compensated waveforms having an identical phase, through trigonometric function operations of normalized waveforms of digitally converted sine and cosine waves, which are converted from ME (magnetic encoder) output sine and cosine waves output from a magnetic encoder, and configured to adjust amplitudes of the two phase-compensated waveforms to be equal, thereby generating input sine and cosine waves having an identical phase and an identical amplitude;

an advanced phase detector configured to generate an error output signal through trigonometric function operations of the input sine wave, the input cosine wave, and a compensated sine wave and a compensated cosine wave having an estimated phase, so that the error output signal has a sine term of a phase error, between a phase, of the input sine wave or the input cosine wave, and the estimated phase, of the compensated sine wave or the compensated cosine wave, as a multiplying term;

a loop filter configured to set a filter transfer function of an active lead-lag filter based on a natural frequency and a damping factor determined based on the error output signal and overshoot, and to filter the error output signal using the active lead-lag filter;

a voltage controlled oscillator (VCO) configured to generate a compensated signal including the compensated sine and cosine waves having the estimated phase based on a signal obtained by passing the filtered error output signal through an integrator having a predetermined gain; and a pulse generator configured to output a phase index, corresponding to a current phase of the compensated sine and cosine waves, selected among M fractionized phase indices obtained from fractionizing a full range of phase within a single period of the compensated sine and cosine waves by M, and configured to generate two output pulses having a phase difference of 90 degrees in accordance with a pulse generation rule found in a look-up table, based on the phase index of the current phases, the look-up table storing pairs of size values of frequency-multiplied sin and cosine waves assigned to each of the phase indices.

The pre-calibration unit may be operated to generate input sine and cosine waveforms phase-compensated to have an identical phase through addition and subtraction of the normalized sine and cosine waveforms.

The pre-calibration unit may be operated to generate input sine and cosine waveforms phase-compensated to have an identical phase by compensating the normalized sine waveform as much as $(\pi+2\delta)/4$ and the normalized cosine waveform as much as $(\pi-2\delta)/4$, wherein $\delta$ is a phase shift between the ME output sine and cosine waves.

The advanced phase detector may be operated to perform low-frequency filtering on the input sine and cosine waves.

The advanced phase detector may be operated to, in order to address phase delay attributable to the low-frequency filtering of the input sine and cosine waves, generate an error output signal by performing trigonometric function operations of the phase-delayed low-frequency filtered input and cosine waves and the compensated sine and cosine waves having an estimated phase, so that the error output signal has multiplying terms: a sine term of the phase error between the phase, of the input sine and cosine waves, and the estimated phase, of the compensated sine and cosine waves, and a cosine term, related to the phase delay.

The loop filter may include a parameter adjustment unit configured to determine the natural frequency and the damping factor based on a magnitude of the error output signal and the overshoot; and an active lead-lag filter configured to filter the error output signal using the filter transfer function set based on the natural frequency and the damping factor.

The parameter adjustment unit may be operated to determine the natural frequency and the damping factor, calculated based on the magnitude of the error output signal and the size of the derivative of the waveform, within a range of stability of a system.

The VCO may be operated to generate a compensated signal including compensated sine and cosine waves having the estimated phase by adding a signal, obtained by passing an oscillation frequency through an integrator, to a signal, obtained by passing the filtered error output signal through an integrator having a predetermined gain.

The pulse generator may include a phase index calculation unit configured to output a phase index, corresponding to a current phase of the compensated sine and cosine waves, selected among phase indices obtained from fractionizing a full range of phase within a single period of the compensated sine and cosine waves; a look-up table configured to store pairs of size values of frequency-multiplied sin and cosine waves assigned to each of the phase indices; and a waveform generation unit configured to generate two output pulses having a phase difference of 90 degrees in accordance with a pulse generation rule, by which pulses are generated using hysteresis adapted to compare a change in size values of the frequency-multiplied-by-integer sine and cosine waves with threshold values at two different levels, the size values being found in the look-up table based on the phase index of the current phase.

The pulse generator generates output pulses each having any state of a first state having a pulse level of 1 and a second state having a pulse level of 0; and the pulse generation rule is a rule for determining the states of the output pulses in a manner that: when a level of the frequency-multiplied sine or cosine wave rises above a first threshold value, which is relatively high, the pulse turns to a first state having the pulse level of 1, and then remains in the first state until it turns to a second state; and when the level of the frequency-multiplied sine or cosine wave falls below a second threshold value, which is relatively low, the pulse turns to the second state having the pulse level of 0, and then remains in the second state until it turns to the first state.

In accordance with another aspect of the present invention, there is provided an apparatus for compensating output signals of a magnetic encoder, including a pre-calibration unit configured to obtain two phase-compensated waveforms having an identical phase through trigonometric function operations of normalized waveforms of digitally converted sine and cosine waves, which are converted from ME (magnetic encoder) output sine and cosine waves output from a magnetic encoder, and configured to adjust amplitudes of the two phase-compensated waveforms to an identical value, thereby generating input sine and cosine waves having the same phase and the same amplitude;

an advanced phase detector configured to generate an error output signal having information about a phase error between a phase of the input sine and cosine waves and an estimated phase of the compensated sine and cosine waves;

a loop filter configured to filter the error output signal using an active lead-lag filter having a filter transfer function set based on a natural frequency and a damping factor;

a VCO configured to generate the compensated sine and cosine waves having the estimated phase based on the filtered error output signal; and a pulse generator configured to generate two output pulses so as to have predetermined pulse levels and a phase difference of 90 degrees, corresponding to a current phase index, selected among multiple fractionized phase indices obtained from fractionizing a full range of phase within a single period of the compensated sine or cosine wave.

The pre-calibration unit may generate a phase-compensated input sine waveform $u_{s1}$ and a phase-compensated input cosine waveform $u_{c1}$ having the same phase by performing addition and subtraction of the normalized cosine waveform $u_{cN}$ and the normalized sine waveform $u_{sN}$, and may obtain the input sine wave $u_s$ and input cosine wave $u_c$ by adjusting amplitudes $A_1$ and $A_2$ of the phase-compensated waveforms $u_{s1}$ and $u_{c1}$ so that $A = k_1 \cdot A_1 = k_2 \cdot A_2$, in accordance with the following Equations:

$$u_{s1} = u_{cN} + u_{sN}$$
$$= 2A_N \cos\frac{\pi+2\delta}{4}\sin\left(\theta + \frac{\pi+2\delta}{4}\right)$$
$$= A_1 \sin\varphi$$

$$u_{c1} = u_{cN} - u_{sN}$$
$$= 2A_N \sin\frac{\pi+2\delta}{4}\cos\left(\theta + \frac{\pi+2\delta}{4}\right)$$
$$= A_2 \cos\varphi$$

$$u_s = A\sin\phi$$
$$u_c = A\cos\phi$$

where $A_1$ and $A_2$ are amplitudes of the normalized waveforms, $\theta$ is a phase of the ME output sine wave, $\delta$ is a phase difference between the ME output sine and cosine waves, and $\phi$ is a phase of the input sine wave.

The advanced phase detector may be operated to generate the error output signal in accordance with the following Equation:

$$u_0 = u_{sf}\cos\hat\varphi - u_{cf}\sin\hat\varphi = A\sin(e-\beta)$$
$$u_x = u_{sf}\sin\hat\varphi + u_{cf}\cos\hat\varphi = A\sin(e-\beta)$$
$$u_a = u_{a1} = u_s\sin\hat\varphi + u_c\cos\hat\varphi = A\cos e$$
$$u_t = u_{t1} = u_s u_{cf} - u_c u_{sf} = A^2 \sin\beta$$
$$u_{01} = (u_0^2 + u_x^2) \cdot u_0$$
$$u_{02} = u_a u_t = A^3 \cos e \sin\beta$$
$$u_e = u_{01} + u_{02}$$
$$= A^3(\sin(e-\beta) + \cos e \sin\beta)$$
$$= A^3 \cos\beta \sin e$$

where $u_s$ is the input sine wave, $u_c$ is the input cosine wave, $u_{sf}$ is the low-frequency filtered input sine wave, $u_{cf}$ is the low-frequency filtered input cosine wave, $\sin\hat\phi$ and $\cos\hat\phi$ are a sine wave and a cosine wave, respectively, that have an estimated phase $\hat\phi$ to be feed-backed, $\hat\phi$ is a phase of the input sine wave, e is a phase error of $\phi-\hat\phi$, $\beta$ is phase delay that occurs upon low-frequency filtering, A is an amplitude of the input sine wave $u_s$ and the input cosine wave $u_c$, and $u_e$ is the error output signal.

The loop filter may include a parameter adjustment unit configured to determine the natural frequency $\omega_n$ and the damping factor $\zeta$ based on a magnitude of the error output signal and overshoot; and an active lead-lag filter configured to filter the error output signal using a filter transfer function set based on the natural frequency $\omega_n$ and the damping factor $\zeta$ and expressed by the following Equation:

$$F(s) = \omega_n^2 + (2\zeta\omega_n - \omega_n^2 - 1)\frac{s}{1+s}$$

The parameter adjustment unit may determine the natural frequency $\omega_n$ and the damping factor $\zeta$ in accordance with the following Equations:

$$\begin{cases} \omega_n = K_1 \cdot |u_e| + K_2 \left|\frac{\partial u_e}{\partial t}\right| \text{ with } \omega_n \in [\omega_{nmin}; \omega_{nmax}] \\ \zeta = K_3 \cdot |u_e| + K_4 \left|\frac{\partial u_e}{\partial t}\right| \text{ with } \zeta \in [\zeta_{min}; \zeta_{max}] \end{cases}$$

$$\left|\frac{\partial u_e}{\partial t}\right| = |u_{ek-2} - 4u_{ek-1} + 3u_{ek}|/2T_s$$

where $K_1$, $K_2$, $K_3$ and $K_4$ are limiting coefficients that limit the natural frequency $\omega_n$ and the damping factor $\zeta$ so that the natural frequency $\omega_n$ and the damping factor $\zeta$ are determined within a stable range between $[\omega_{n\,min}; \omega_{n\,max}]$ and $[\zeta_{min}; \zeta_{max}]$, $u_e$ is the error output signal, $u_{ek}$, $u_{ek-1}$ and $u_{ek-2}$ are a current sample, an immediately previous sample and a second previous sample of a discrete representation of $u_e$, and $T_s$ is a discrete sampling period.

The pulse generator may be operated to generate two output pulses having a phase difference of 90 degrees in accordance with a pulse generation rule using hysteresis having threshold values at two different levels.

The pulse generator may generate output pulses each having any state of a first state having a pulse level of 1 and a second state having a pulse level of 0; and the pulse generation rule is a rule for determining the states of the output pulses in a manner that:

when a level of the frequency-multiplied sine or cosine wave rises above a first threshold value, which is relatively high, the pulse turns to a first state having the pulse level of 1, and then remains in the first state until it turns to a second state; and when the level of the frequency-multiplied sine or cosine wave falls below a second threshold value, which is relatively low, the pulse turns to the second state having the pulse level of 0, and then remains in the second state until it turns to the first state, as expressed by the following Equations:

$$\begin{cases} 1^{st} \text{ state: } u_{in} \text{ rise \& } u_{in} \geq V_{high} \rightarrow \text{Pulse} = 1 \text{ \& hold till } 2^{nd} \text{ state} \\ 2^{nd} \text{ state: } u_{in} \text{ fall \& } u_{in} \leq V_{low} \rightarrow \text{Pulse} = 0 \text{ \& hold till } 1^{st} \text{ state} \end{cases}$$

In accordance with still another aspect of the present invention, there is provided a method of compensating output signals of a magnetic encoder, including obtaining two phase-compensated waveforms having an identical phase through trigonometric function operations of normalized waveforms of digitally converted sine and cosine waves which are converted from ME (magnetic encoder) output sine and cosine waves output from a magnetic encoder, and adjusting amplitudes of the two phase-compensated waveforms to an identical value, thereby generating input sine and cosine waves having the same phase and the same amplitude; generating an error output signal through trigonometric function operations of the input sine wave, the input cosine wave, and a compensated sine wave and a compensated cosine wave having an estimated phase, so that the error output signal has a sine term, as a multiplying term, of a phase error between a phase, of the input sine wave and the input cosine wave, and the estimated phase, of the compensated sine wave and the compensated cosine wave; setting a filter transfer function of an active lead-lag filter based on a natural frequency and a damping factor determined based on the error output signal and overshoot, and filtering the error output signal using the active lead-lag filter; generating a compensated signal including the compensated sine and cosine waves having the estimated phase based on a signal obtained by passing the filtered error output signal through an integrator having a predetermined gain; and outputting a phase index, corresponding to a current phase of the compensated sine and cosine waves, selected among multiple fractionized phase indices obtained from fractionizing a full range of phase within a single period of the compensated sine and cosine waves, and generating two output pulses having a phase difference of 90 degrees in accordance with a pulse generation rule found in a look-up table, based on the phase index of the current phases, the look-up table storing pairs of size values of frequency-multiplied sin and cosine waves assigned to each of the phase indices.

In accordance with yet another aspect of the present invention, there is provided a computer-readable storage medium having a program stored thereon, the program implementing the method of compensating output signals of a magnetic encoder according to an embodiment of the present invention.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
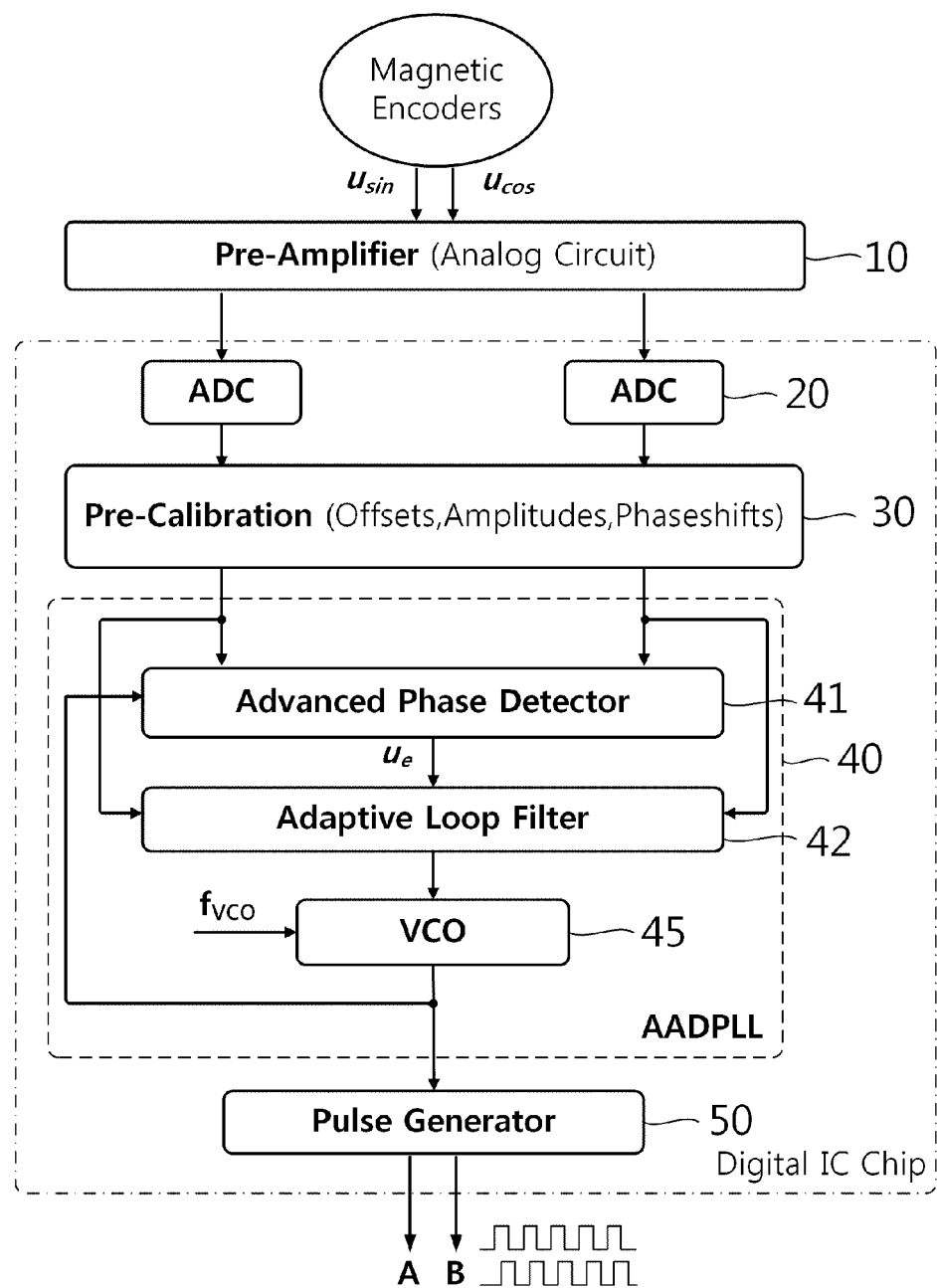
FIG. 1 is a schematic block diagram of an apparatus for compensating output signals of a magnetic encoder using a digital PLL according to an embodiment of the present invention.

In the following description of embodiments of the present invention, specific structural and functional descriptions are provided merely for the purpose of illustrating the embodiments of the present invention, and the present invention may be practiced in various forms and should not be construed as being limited to the embodiments herein.

Example embodiments of the present invention are described in greater detail below with reference to the accompanying drawings. The same reference numerals are assigned to the same components throughout the drawings, and redundant descriptions of the same components are omitted.

FIG. 1 is a schematic block diagram of an output signal compensation apparatus for compensating output signals of a magnetic encoder using a digital PLL according to an embodiment of the present invention.

Referring to FIG. 1, the output signal compensation apparatus 1 of a magnetic encoder (ME) may include a pre-amplifier 10, an analog digital converter (ADC) 20, a pre-calibration unit 30, an advanced adaptive digital phase locked loop 40, and a pulse generator 50.

The pre-amplifier 10 is an analog differential amplifier having, for example, a predetermined gain. The pre-amplifier 10 functions to reject the common mode noise of an input differential signal pair and to amplify the amplitude of the differential signal pair to a value suitable for the full input range of the analog digital converter 20 in its subsequent stage. Furthermore, the pre-amplifier 10 operates as a type of analog low frequency filter (LPF) with respect to a differential signal pair in the range from tens of Hz to several kHz, and thus can reduce high-frequency noise.

Accordingly, the pre-amplifier 10 receives a pair of two sine wave signals, that is, an ME output sine wave $u_{sin}$ and an ME output cosine wave $u_{cos}$ having a phase difference of about 90 degrees, output from the magnetic encoder, rejects common mode noise, and appropriately amplifies the amplitudes of the two signals.

The output signal pair of the magnetic encoder suffers from problems, such as DC offset, phase shift, random noise, and different magnitudes. The ME output sine wave $u_{sin}$ and the ME output cosine wave $u_{cos}$ having the above problems may be expressed by the following Equation 1:

$$\begin{cases} u_{sin} = A_s \sin\theta + B_s + \eta_1(t) \\ u_{cos} = A_c \cos(\theta + \delta) + B_c + \eta_2(t) \end{cases} \quad (1)$$

where $A_s$ and $A_c$ are the amplitudes of the ME output sine wave and the ME output cosine wave, respectively, $B_s$ and $B_c$ are the DC offsets of the ME output sine wave and the ME output cosine wave, respectively, $\eta_1$ and $\eta_2$ are the noise distortions of the ME output sine wave and the ME output cosine wave, respectively, and $\delta$ is the phase shift of the ME output cosine wave with respect to the ME output sine wave.

Figure 2:
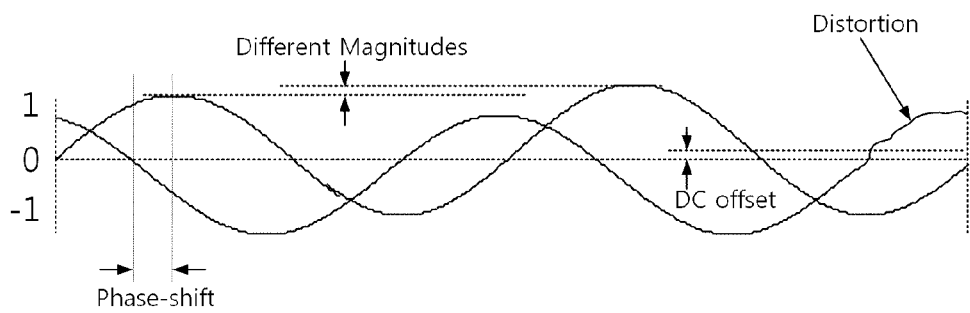
FIG. 2 is a waveform diagram illustrating sine and cosine waves, including noise, as the output signals of a magnetic encoder in the apparatus for compensating output signals of a magnetic encoder using a digital PLL according to an embodiment of the present invention.

The waveforms of Equation 1 are exemplified by FIG. 2. FIG. 2 is a waveform diagram illustrating sine and cosine waves, including noise, as the output signals of a magnetic encoder in the apparatus for compensating output signals of a magnetic encoder using a digital PLL according to an embodiment of the present invention.

In an ideal case, the cosine wave zero-crosses when the sine wave has a maximum value, and thus there should be no phase shift. However, in FIG. 2, there is a time difference from the time at which the cosine wave zero-crosses to the time at which the sine wave reaches a maximum value, and there is phase shift $\delta$ as phase corresponding to the time difference.

Furthermore, there appear the following problems: the respective amplitudes, which mean the maximum values of the sine and cosine waves, are different (different magnitudes); respective DC levels, which mean the median values of the waveforms, are different from each other (DC offset); and distortions caused by noise.

Referring back to FIG. 1, the ME output sine wave $u_{sin}$ and the ME output cosine wave $u_{cos}$ amplified by the pre-amplifier 10 are digitally amplified by the ADC 20 with an appropriate resolution of, for example, 12 bits.

Since the pre-amplifier 10 merely amplifies the ME output sine wave $u_{sin}$ and the ME output cosine wave $u_{cos}$ within a range where their maximum levels don't exceed the full input range of the ADC 20 in the subsequent stage, a digitally-converted sine wave $u_{sin\_ADC}$ converted from the ME output sine wave $u_{sin}$ and a digitally-converted cosine wave $u_{cos\_ADC}$ converted from the ME output cosine wave $u_{cos}$ still have significant DC offset, amplitude difference and phase shift.

Accordingly, it is necessary to reduce the DC offset and the amplitude difference by inputting the digitally-converted sine wave $u_{sin\_ADC}$ and the digitally-converted cosine wave $u_{cos\_ADC}$ into the pre-calibration unit 30 operating in a digital manner, prior to applying the digitally-converted sine wave $u_{sin\_ADC}$ and the digitally-converted cosine wave $u_{cos\_ADC}$ to the AADPLL 40. Furthermore, to generate a ultimately compensated pulse train, only the phase value of a waveform matters and the size of the waveform is relatively insignificant, and thus the waveform of any possible magnitude is necessary to be normalized, to match a predetermined input range within which the AADPLL 40 is operable. Furthermore, if the phase shift has an almost invariable value, it may be assumed to be a constant. The phase shift may be substantially eliminated based on the operation formula of two trigonometric functions having the same amplitude.

Figure 3:
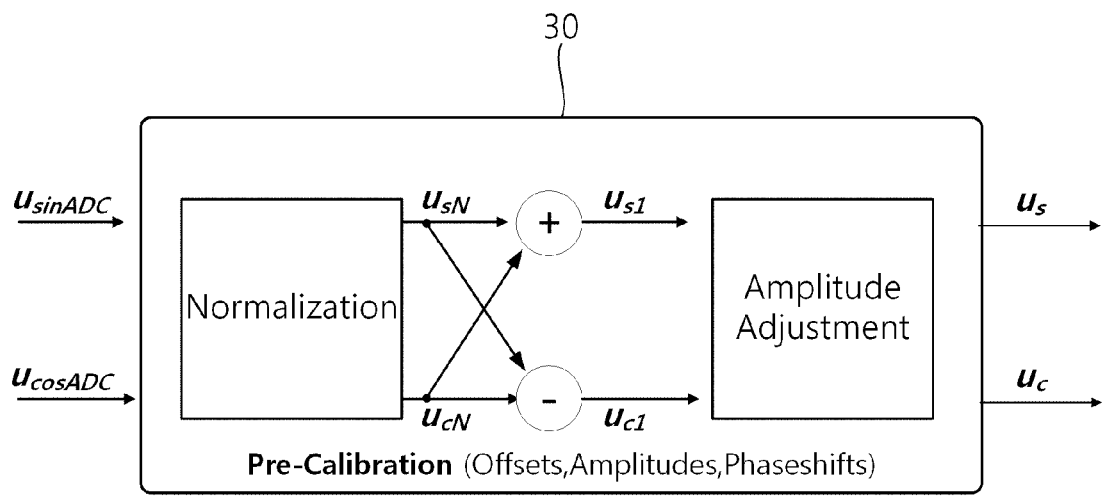
FIG. 3 is a block diagram illustrating the pre-calibration unit of the apparatus for compensating output signals of a magnetic encoder using a digital PLL according to an embodiment of the present invention.

FIG. 3 is a block diagram of the pre-calibration unit of the apparatus for compensating output signals of a magnetic encoder using a digital PLL according to an embodiment of the present invention.

If the amplitude and offset of each of the digitally-converted sine wave $u_{sin\_ADC}$ and the digitally-converted cosine wave $u_{cos\_ADC}$ are considered to be fixed values because they show only a slight change during operation, they may be expressed by the following Equation 2:

$$\begin{cases} Amp_X = (A_{Xmax} - A_{Xmin})/2 \\ Off_X = (A_{Xmax} + A_{Xmin})/2 \end{cases} \quad (2)$$

where the subscript X refers to a sin ADC or a cos ADC, $Amp_X$ is the amplitude, $Off_X$ is the offset, $A_{X\,max}$ is the maximum value of the waveform, and $A_{X\,min}$ is the minimum value of the waveform.

The normalization may be performed by dividing a value, obtained by subtracting the offset from an original signal, by the amplitude, as expressed by the following Equation 3:

$$u_{XN} = \frac{u_{sin\,or\,cos\,ADC} - off_X}{Amp_X} \quad (3)$$

A normalization sine wave $u_{sN}$ and a normalization cosine wave $u_{cN}$ has a normalized amplitude $A_N$ in the same manner, and still has a phase shift δ originating from the initial ME output signals $u_{sin}$ and $u_{cos}$, as expressed in Equation 4:

$$\begin{cases} u_{sN} = A_N \sin\theta \\ u_{cN} = A_N \cos(\theta + \delta) \end{cases} \quad (4)$$

Since the phase shift δ occurs depending on the physical, structural and individual device attributes of each magnetic encoder, the phase shift δ may be considered to be a constant if it is assumed that the phase shift δ is unique to each magnetic encoder and scarcely changes.

When the normalization sine wave $u_{sN}$ and normalization cosine wave $u_{cN}$ of Equation 4 are added or subtracted using the additive formula of the trigonometric function, the following Equation 5 is obtained:

$$\begin{aligned} u_{s1} &= u_{cN} + u_{sN} \\ &= 2A_N \cos\frac{\pi+2\delta}{4}\sin\left(\theta+\frac{\pi+2\delta}{4}\right) \\ &= A_1 \sin\varphi \end{aligned} \quad (5)$$

$$\begin{aligned} u_{c1} &= u_{cN} - u_{sN} \\ &= 2A_N \sin\frac{\pi+2\delta}{4}\cos\left(\theta+\frac{\pi+2\delta}{4}\right) \\ &= A_2 \cos\varphi \end{aligned}$$

Referring to Equation 5, two trigonometric function waveforms $u_{cN}$ and $u_{cN}$ having the same phase δ are obtained. It can be seen that the two waveforms are merely obtained by adding a fixed phase value, that is, $(\pi+2\delta)/4$, to the phase θ of the original magnetic output signals, and thus rotational position information transferred by the phase is maintained without change, with the result that the same rotational detection results can be obtained even when the phase θ, instead of phase φ, is used.

In an embodiment, for example, even when the sine wave is phase-compensated by $(z+2\delta)/4$ and the cosine wave is phase-compensated by $(\pi-2\delta)/4\pi-2\delta/4$ directly based on Equation 4, rather than based on Equation 5, sine and cosine waves having the same phase may be obtained in the same manner.

However, the amplitudes of the two trigonometric function waveforms $u_{s1}$ and $u_{c1}$ are $A_1$ and $A_2$, respectively, which are different from each other. If the same sized $A=k_1 \cdot A_1 = k_2 \cdot A_2$ is obtained by multiplying $A_1$ and $A_2$ by proportional constants $k_1$ and $k_2$, respectively, so that the above amplitude values are made equal, an input sine wave $u_s$ and an input cosine wave $u_c$ having the same amplitude A and the same phase φ may be obtained, as expressed by Equation 6:

$$u_s = A \sin\varphi$$

$$u_c = A \cos\varphi \quad (6)$$

As described above, the pre-calibration unit 30 obtains phase-compensated waveforms having the same phase by compensating a phase shift δ by a predetermined fixed phase value, for example, $(\pi+2\delta/4)$, through the trigonometric function operations of the normalized waveforms of the digitally-converted sine wave $u_{sin\_ADC}$ and the digitally-converted cosine wave $u_{cos\_ADC}$, and then generates the input sine wave $u_s$ and the input cosine wave $u_c$ having the same phase φ and the same amplitude A, as illustrated in Equation 6, for the use of the following AADPLL 40, by adjusting the amplitudes of the two phase-compensated waveforms to the same value.

Although in theory, it seems to be expected that the phase shift, the amplitude difference and the DC offset will be completely eliminated together, with some noise, based on the assumption that the phase shift δ is a constant, these error components just decrease in reality.

Accordingly, in order to eliminate the error components, the following AADPLL 40 has the purpose of newly generating a compensated signal including a pair of sine and cosine waves having an estimated phase $\hat{\varphi}$, pursuing the compensated phase φ, and a phase of $\hat{\varphi}+90$ degrees, respectively.

A general analog PLL outputs an oscillation signal by performing a phase detection function for comparing the phase of a target signal with the phase of an output signal and for detecting a phase difference, a loop filter function for adjusting the lead-lag and for settling levels of waveforms based on the detected phase difference, and a function of adjusting frequency using the nonlinearity of an analog circuit based on the level of a voltage value output from a loop filter.

The AADPLL 40 may include an advanced phase detector 41, an advanced loop filter 42, a parameter adjustment unit 43, an active lead-lag filter unit 44, and a voltage controlled oscillator (VCO) 45, as illustrated in FIGS. 4 to 8.

Figure 4:
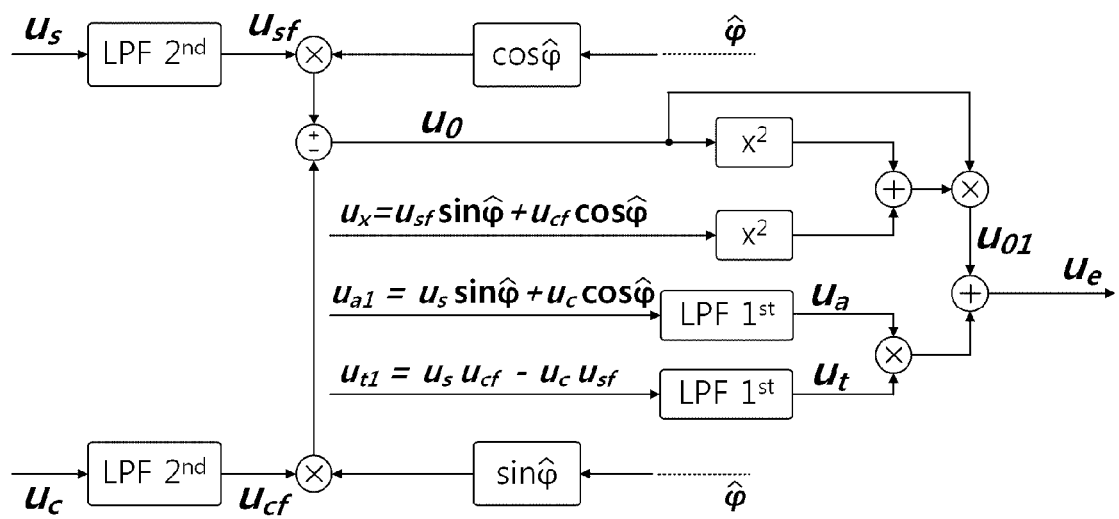
FIG. 4 is a block diagram illustrating, in detail, the advanced phase detector of the AADPLL in the apparatus for compensating output signals of a magnetic encoder using a digital PLL according to an embodiment of the present invention apparatus.

FIG. 4 is a block diagram illustrating, in detail, the advanced phase detector of the AADPLL in the apparatus for compensating output signals of a magnetic encoder using a digital PLL according to an embodiment of the present invention apparatus.

Referring to FIG. 4, the advanced phase detector 41 of the AADPLL 40 may further include a plurality of low frequency filters 411, 412, 413 and 414 in order to improve the performance of the detection of the phase error $e=\varphi-\hat{\varphi}$ between the compensated phase φ and the estimated phase $\hat{\varphi}$ estimated by the AADPLL 40 to follow the compensated phase φ.

In particular, the first low frequency filters 411 and 412 for the phase-compensated input sine wave $u_s$ and input cosine wave $u_c$ may be implemented using 2nd order Butterworth filters in order to achieve high frequency suppression performance, and the second low frequency filters 413 and 414 for the estimated phase $\hat{\phi}$ having high frequency noise not much may be implemented using 1st order Butterworth filters.

In general, a low frequency filter generates time delay. In contrast, a high-order Butterworth filter generates considerable time delay, and thus non-negligible phase delay may be generated. However, the phase delay generated by the second low frequency filters 413 and 414, which are 1st order filters, is negligible.

Accordingly, when the input sine wave $u_s$ and the input cosine wave $u_c$ pass through the first low frequency filters 411 and 412, that is, 2nd order filters, the phase delay $\beta$ caused by the first low frequency filters 411 and 412 may be generated with respect to the filtered input sine wave $u_{sf}$ and input cosine wave $u_{cf}$, as expressed by Equation 7:

$$u_{sf} = A \sin(\phi-\beta)$$

$$u_{cf} = A \cos(\phi-\beta) \quad (7)$$

In this case, given the phase error $e=\phi-\hat{\phi}$, signals may be defined as the following Equation 8, such that the phase delay $\beta$ is eliminated and only the phase error e is left, based on Equation 7 and the feed-backed estimated phase $\hat{\phi}$:

$$u_0 = u_{sf}\cos\hat{\phi} - u_{cf}\sin\hat{\phi} = A\sin(e-\beta)$$

$$u_x = u_{sf}\sin\hat{\phi} + u_{cf}\cos\hat{\phi} = A\sin(e-\beta)$$

$$u_a = u_{a1} = u_s\sin\hat{\phi} + u_c\cos\hat{\phi} = A\cos e$$

$$u_t = u_{t1} = u_s u_{cf} - u_c u_{sf} = A^2\sin\beta \quad (8)$$

In Equation 8, $\sin\hat{\phi}$ and $\cos\hat{\phi}$ are a sine wave and a cosine wave, respectively, that have the estimated phase $\hat{\phi}$ and are feed-backed.

Among the signals of Equation 8 regarding the phase error e and the phase delay $\beta$, squaring $u_0$ and $u_x$ respectively and adding them result in $A^2$. Multiplying $A^2$ by $u_0$ lead to $u_{01}$. Multiplying $u_a$ and $u_t$ results in $u_{02}$. A phase error signal $u_e$, in which the phase delay $\beta$ and the phase error e are separate from each other, as in Equation 9, is obtained by adding $u_{01}$ and $u_{02}$.

$$u_{01} = (u_0^2 + u_x^2) \cdot u_0 \quad (9)$$

$$u_{02} = u_a u_t$$

$$= A^3 \cos e \sin\beta$$

$$u_e = u_{01} + u_{02}$$

$$= A^3(\sin(e-\beta) + \cos e \sin\beta)$$

$$= A^3 \cos\beta \sin e$$

The phase delay $\beta$ may be considered to be a constant with respect to each input frequency, and sin e may be approximated as e if the phase error e is small, that is, equal to or less than 10 degrees. If the gain of the advanced phase detector 41 with respect to the phase error e of an error output signal $u_e$ is $K_{PD}$, $K_{PD}=A^3\cos\beta$. The error output signal $u_e$ of the advanced phase detector 41 may be arranged, as expressed by the following Equation 10:

$$u_e = K_{PD}\sin e \approx K_{PD}e \quad (10)$$

As described above, the advanced phase detector 41 performs the trigonometric function operations of the input sine wave $u_s$, the input cosine wave $u_c$, and the compensated sine wave $\sin\hat{\phi}$ and the compensated cosine wave $\cos\hat{\phi}$ having the estimated phase $\hat{\phi}$, thereby generating an error output signal $u_e$ so that the error output signal $u_e$ has information about the phase error $e=\phi-\hat{\phi}$ between the phase $\phi$ of the input sine wave $u_s$ and the input cosine wave $u_c$ and the estimated phase $\hat{\phi}$ of the compensated sine wave and the compensated cosine wave, for example, as the multiplying term sin e.

In the case where phase delay $\beta$ becomes not negligible due to low frequency filtering of the input sine wave $u_s$ and the input cosine wave $u_c$ in order to eliminate noise, the trigonometric function operations of the filtered input sine wave $u_{sf}$ and the filtered input cosine wave $u_{cf}$, being phase-delayed by phase delay $\beta$, and the compensated sine wave $\sin\hat{\phi}$ and the compensated cosine wave $\cos\hat{\phi}$, compensated to have estimated phase $\hat{\phi}$, are performed, thereby generating an error output signal $u_e$ so that the error output signal $u_e$ has sin e related to the phase error $e=\phi-\hat{\phi}$ between the phase $\phi$ of the input sine wave $u_s$ and the input cosine wave $u_c$ and the estimated phase $\hat{\phi}$ of the compensated sine wave and the compensated cosine wave and $\cos\beta$ related to the phase delay $\beta$ as respective multiplying terms.

As described above, the advanced phase detector 41 may generate the error output signal $u_e$ proportional to the phase error e in spite of the phase delay $\beta$ of the low frequency filters 411 and 412 that are added to improve performance.

Thereafter, the error output signal $u_e$ of the advanced phase detector 41 is applied to the loop filter 42.

Figure 5:
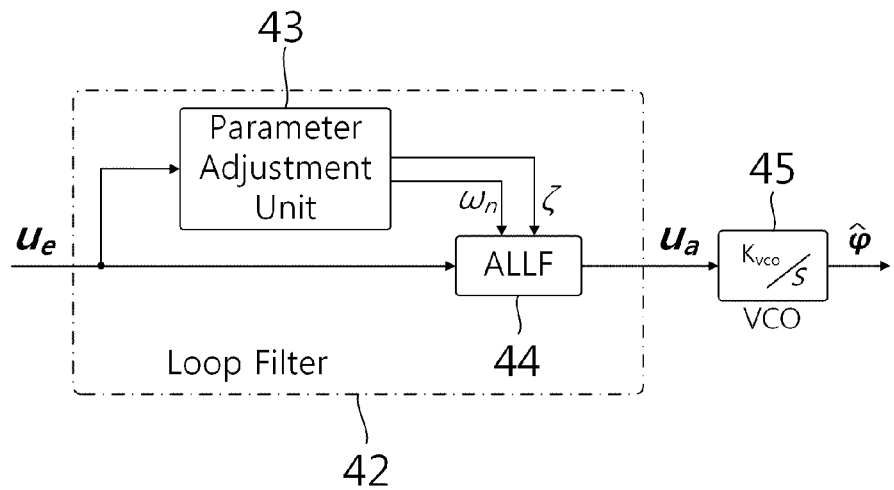
FIG. 5 is a block diagram illustrating, in detail, the loop filter of the AADPLL in the apparatus for compensating output signals of a magnetic encoder using a digital PLL according to an embodiment of the present invention.

FIG. 5 is a block diagram illustrating, in detail, the loop filter of the AADPLL in the apparatus for compensating output signals of a magnetic encoder using a digital PLL according to an embodiment of the present invention.

Referring to FIG. 5, the loop filter 42 includes a parameter adjustment unit 43, and an active lead-lag filter unit 44.

If the transfer function F(s) of a loop filter is expressed by Equation 11, the closed-loop transfer function H(s) of a common analog loop filter is expressed by Equation 12:

$$F(s) = K_F \frac{1+sT_2}{1+sT_1} \quad (11)$$

where $F_F=F_P$ is filter gain and $T_1$ and $T_2$ are filter coefficients.

$$H(s) = \frac{K_p(1+sT_2)/T_1}{s^2+s(1+K_pT_2)/T_1+K_p/T_1} \quad (12)$$

$$= \frac{\omega_n(2\zeta-\omega_n/K_p)s+\omega_n^2}{s^2+2\zeta\omega_n s+\omega_n^2}$$

The natural frequency $\omega_n$ and damping factor $\zeta$ of the denominator of the transfer function H(s) may be defined, as represented by Equation 13:

$$\omega_n = \sqrt{K_p/T_1},$$

$$\zeta = (1+K_pT_2)/2\sqrt{T_1K_p} \quad (13)$$

The natural frequency $\omega_n$ and the damping factor $\zeta$ are the most important coefficients that determine the stability, filter characteristics, dynamic characteristics and bandwidth of the loop. If the natural frequency $\omega_n$ is high, the acquisition time of the PLL is reduced, but an unwanted output may be generated because sensitivity to noise increases. However, in a common PLL, the natural frequency $\omega_n$ and the damping factor $\zeta$ are values fixed upon design and cannot be adjusted.

The loop filter 42 of the present invention is based on the filter transfer function F(s) of the active lead-lag filter unit 44, as expressed by Equation 11, but finally realizes a transfer function having the same effect as the transfer function of Equation 12 by actively adjusting the natural frequency $\omega_n$ and the damping factor $\zeta$ using the parameter adjustment unit 43 and then applying the results of the adjustment to the active lead-lag filter unit 44, as expressed by Equation 13.

When $T_1$ is set to 1 and then Equation 11 is expressed using the natural frequency $\omega_n$ and the damping factor $\zeta$, the following Equation 14 is obtained:

$$F(s) = K_P \frac{1+sT_2}{1+sT_1} \qquad (14)$$
$$= \frac{\omega_n^2 + s(2\zeta\omega_n - 1)}{1+s}$$
$$= \omega_n^2 + (2\zeta\omega_n - \omega_n^2 - 1)\frac{s}{1+s}$$

Figure 6:
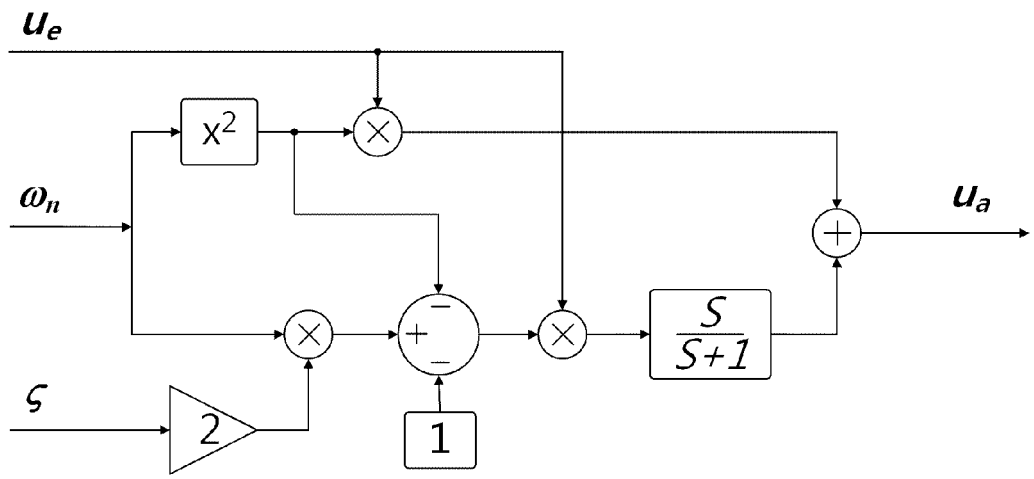
FIG. 6 is a block diagram illustrating, in detail, the active lead-lag filter unit within the loop filter of the AADPLL in the apparatus for compensating output signals of a magnetic encoder using a digital PLL according to an embodiment of the present invention.

The active lead-lag filter unit 44 may be implemented based on the filter transfer function F(s) of Equation 14, as illustrated in FIG. 6.

FIG. 6 is a block diagram illustrating, in detail, the active lead-lag filter unit within the loop filter of the AADPLL in the apparatus for compensating output signals of a magnetic encoder using a digital PLL according to an embodiment of the present invention.

The natural frequency $\omega_n$ and the damping factor $\zeta$ determined by the parameter adjustment unit 43 and the error output signal $u_e$ output from the advanced phase detector 41 are input, and thus the filtered error output signal $u_{ef}$ is generated.

Figure 7:
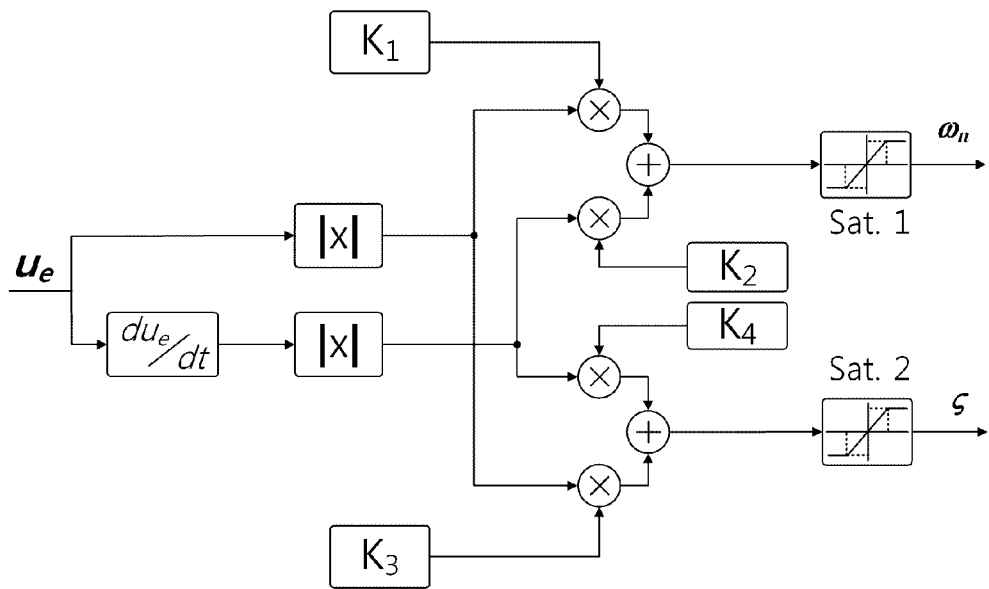
FIG. 7 is a block diagram illustrating, in detail, the parameter adjustment unit within the loop filter of the AADPLL in the apparatus for compensating output signals of a magnetic encoder using a digital PLL according to an embodiment of the present invention.

FIG. 7 is a block diagram illustrating, in detail, the parameter adjustment unit within the loop filter of the AADPLL in the apparatus for compensating output signals of a magnetic encoder using a digital PLL according to an embodiment of the present invention.

The parameter adjustment unit 43 actively adjusts the natural frequency $\omega_n$ and damping factor $\zeta$ of the loop filter 42 depending up the situation. For example, if the error output signal $u_e$ abruptly increases, the natural frequency $\omega_n$ should be increased to maintain the stability of the system. In the opposite case, the natural frequency $\omega_n$ should be decreased. However, when the natural frequency $\omega_n$ excessively increases, the waveform of the output signal $u_{ef}$ of the loop filter 42 may generate overshoot. When the damping factor $\zeta$ increases to a specific predetermined value, the overshoot of the waveform may be decreased. Accordingly, by appropriately adjusting the natural frequency $\omega_n$ and the damping factor $\zeta$, a rapid settling time and a controlled overshoot characteristic may be obtained at the same time.

For this purpose, Equation 15 is obtained by calculating the derivatives of the error output signal $u_e$ by using a discrete Talyor difference formula with third-order approximation, and the natural frequency $\omega_n$ and the damping factor $\zeta$ are specified by the rules of Equation 16:

$$\left|\frac{\partial u_e}{\partial t}\right| \approx |u_{ek-2} - 4u_{ek-1} + 3u_{ek}|/2T_s \qquad (15)$$

$$\begin{cases} \omega_n = K_1 \cdot |u_e| + K_2 \left|\frac{\partial u_e}{\partial t}\right| \text{ with } \omega_n \in [\omega_{nmin}; \omega_{nmax}] \\ \zeta = K_3 \cdot |u_e| + K_4 \left|\frac{\partial u_e}{\partial t}\right| \text{ with } \zeta \in [\zeta_{min}; \zeta_{max}] \end{cases} \qquad (16)$$

where $u_e$ is the error output signal, $u_{ek}$, $u_{ek-1}$ and $u_{ek-2}$ are the current sample, immediately previous sample and second previous sample of the discrete representation of $u_e$, and $T_s$ is a discrete sampling period.

$K_1$, $K_2$, $K_3$ and $K_4$ are the limiting coefficients of the natural frequency $\omega_n$ and the damping factor $\zeta$. Based on these limiting coefficients $K_1$, $K_2$, $K_3$ and $K_4$, the values of the natural frequency $\omega_n$ and the damping factor $\zeta$ are limited within the stable range between $[\omega_{n\,min};\omega_{n\,max}]$ and $[\zeta_{min};\zeta_{max}]$, which are empirically measured in the system, by first and second saturators Sat1 and Sat2.

In other words, the natural frequency $\omega_n$ and the damping factor $\zeta$ may be determined based on the magnitude of the error output signal $u_e$ applied to the loop filter 42, swing speed determined using the derivative of a waveform, and the range of stability of the system.

The filtered error output signal $u_{ef}$ output from the loop filter 42 is applied to the VCO 45.

Figure 8:
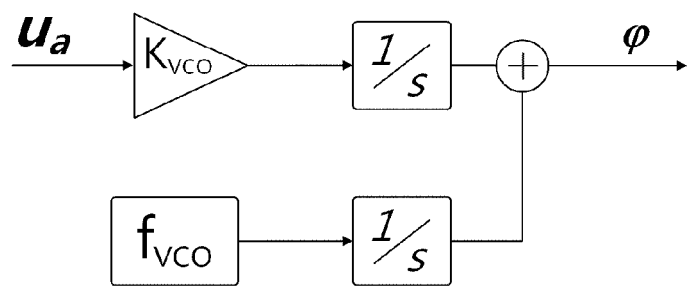
FIG. 8 is a block diagram illustrating, in detail, the VCO of the AADPLL in the apparatus for compensating output signals of a magnetic encoder using a digital PLL according to an embodiment of the present invention.

FIG. 8 is a block diagram illustrating, in detail, the VCO of the AADPLL in the apparatus for compensating output signals of a magnetic encoder using a digital PLL according to an embodiment of the present invention.

Referring to FIG. 8, the VCO 45 may be modeled by an integrator having a gain of $K_{VCO}$. Since a final compensated signal having the estimated phase $\hat{\phi}$ has a center frequency of $\omega_{VCO}$, and may be generated by adding a signal obtained by passing the filtered error output signal $u_{ef}$ through an integrator, whose gain is $K_{VCO}$, to a signal obtained by passing $f_{VCO}$ through an integrator.

A pair of compensated signals oscillated and output by the VCO 45 of the AADPLL 40 are a compensated sine wave and a compensated cosine wave respectively having an estimated phase of $\hat{\phi}$ and a phase of $\hat{\phi}+90°$, which have been compensated by eliminating noise, a phase shift, a DC offset and an amplitude difference.

Thereafter, the pulse generator 50 generates pulse outputs corresponding to the standard pulse outputs of an optical encoder based on the phases of the compensated sine and cosine waves.

Figure 9:
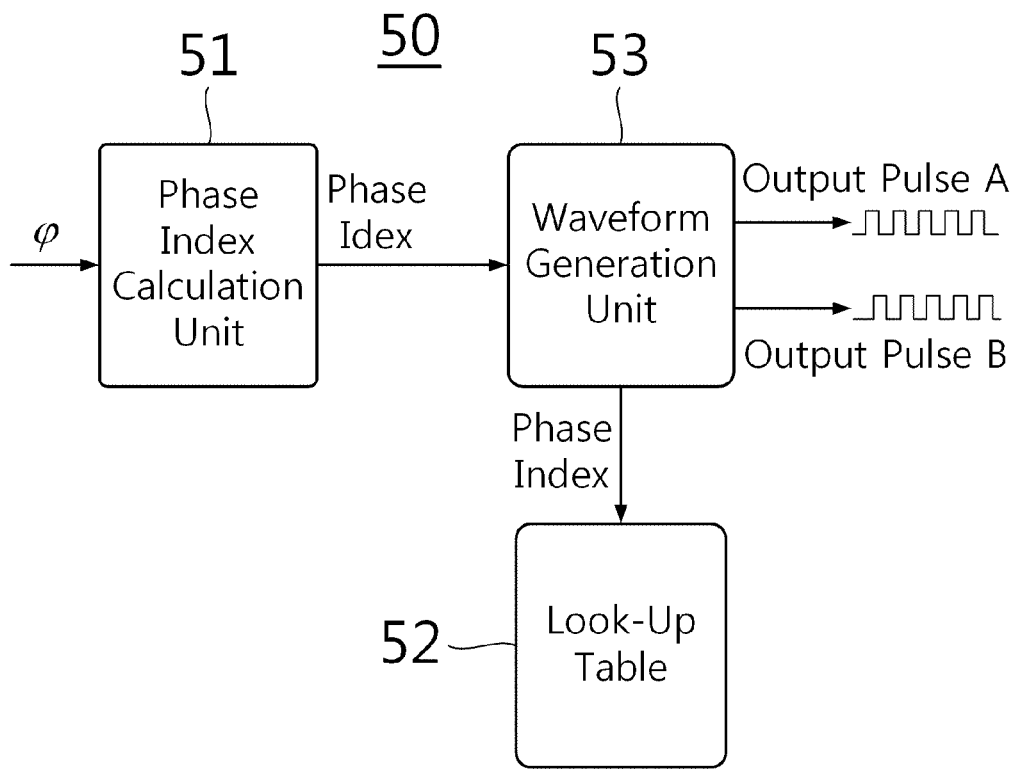
FIG. 9 is a block diagram illustrating, in detail, the pulse generator in the apparatus for compensating output signals of a magnetic encoder using a digital PLL according to an embodiment of the present invention.

FIG. 9 is a block diagram illustrating, in detail, the pulse generator in the apparatus for compensating output signals of a magnetic encoder using a digital PLL according to an embodiment of the present invention.

The pulse generator 50 may include a phase index calculation unit 51 configured to output a phase index, corresponding to a current phase of the compensated sine and cosine waves, among phase indices obtained by fractionizing a full range of phase during a single period of the compensated sine and cosine waves by M; a look-up table 52 configured to store a pair of size values of frequency-multiplied sin and cosine waves assigned to each of the phase indices; and a waveform generation unit 53 configured to generate output pulses in accordance with a pulse generation rule referred to the look-up table 52 based on the phase index of the current phases.

The phase index calculation unit 51 fractionizes a single period 0 to $2\pi$ into M samples, for example, 5656 sampling interval, pairs the size values of compensated sine and cosine waves for each sampling interval, in advance, to be stored, and calculates the current phase index corresponding to a pair of size values of two waveforms when compensated sine and cosine waves are input.

A phase index may be determined to be an integer in the range from 1 to M in such a way as to round off a value, obtained by multiplying the proportion of an estimated phase $\hat{\phi}$ within a single period by M, and by rounding it at the first place of decimals, as expressed by the following Equation 17:

$$\text{Index}=\text{round}(M\cdot\hat{\phi}/2\pi) \qquad (17)$$

Meanwhile, the look-up table 52 stores the size values of frequency-multiplied sine and cosine waves, that are paired for each of the phase indices, and that have a multiplied frequency N times that of compensated sine and cosine waves by N.

Figure 10:
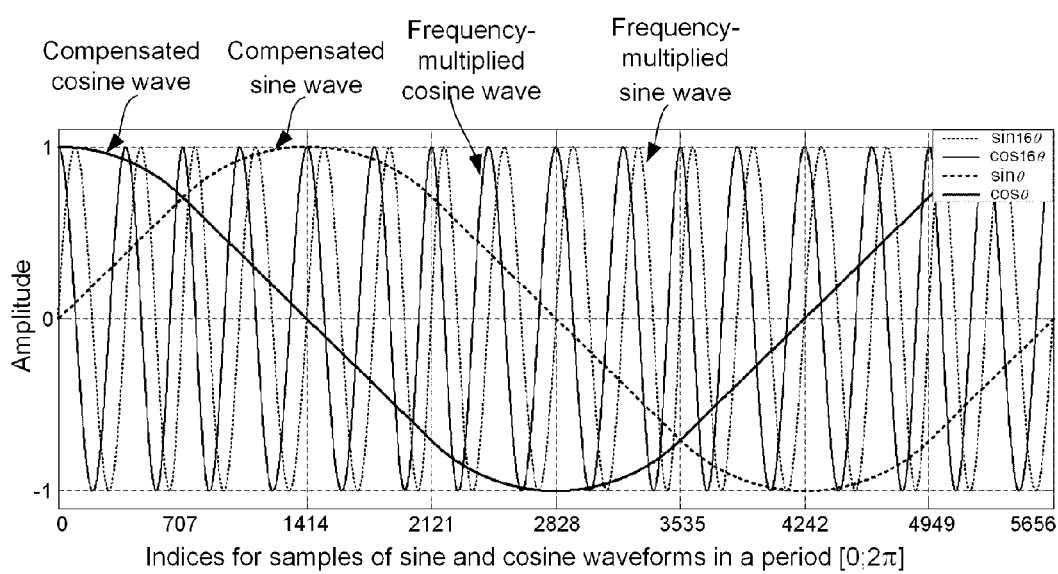
FIG. 10 is a diagram illustrating, in detail, the waveforms of N-multiplied sine and cosine waves stored in the look-up table LUT of the pulse generator in the apparatus for compensating output signals of a magnetic encoder using a digital PLL according to an embodiment of the present invention.

FIG. 10 is a diagram illustrating, in detail, the waveforms of N-times-frequency-multiplied sine and cosine waves stored in the look-up table LUT of the pulse generator in the apparatus for compensating output signals of a magnetic encoder using a digital PLL according to an embodiment of the present invention.

The waveform generation unit 53 may generate two pulse signals having a phase difference of 90 degrees based on the sizes of the multiplied sine and cosine waves found in the look-up table 52.

In this case, since the frequencies of the multiplied sine and cosine waves are considerably higher than the frequency of the compensated sine wave, it is difficult to use a zero-crossing technique for generating the rising and falling edges of a pulse when the zero-crossing of the multiplied sine and cosine waves is detected.

In an embodiment of the present invention, the waveform generation unit 53 may generate two output pulses having a phase difference of 90 degrees in accordance with a pulse generation rule using hysteresis having threshold values $V_{high}$ and $V_{low}$ at two different levels.

More specifically, as expressed by Equation 18, when the level of the frequency-multiplied sine or cosine wave rises above the first threshold value $V_{high}$ that is relatively high, the pulse becomes a first state having a pulse level of 1, and remains in the first state until it enters a second state. In contrast, when the level of the frequency-multiplied sine or cosine wave falls below the second threshold value $V_{low}$ that is relatively low, the pulse becomes the second state having a pulse level of 0, and remains in the second state until it enters the first state.

$$\begin{cases} 1^{st} \text{ state: } u_{in} \text{ rise } \& \ u_{in} \geq V_{high} \rightarrow \text{Pulse} = 1 \ \& \text{ hold till } 2^{nd} \text{ state} \\ 2^{nd} \text{ state: } u_{in} \text{ fall } \& \ u_{in} \leq V_{low} \rightarrow \text{Pulse} = 0 \ \& \text{ hold till } 1^{st} \text{ state} \end{cases} \quad (18)$$

where $u_{in}$ is the frequency-multiplied sine or cosine wave that is obtained by frequency-multiplying the compensation output signal and then input to the waveform generation unit 53.

Figure 11:
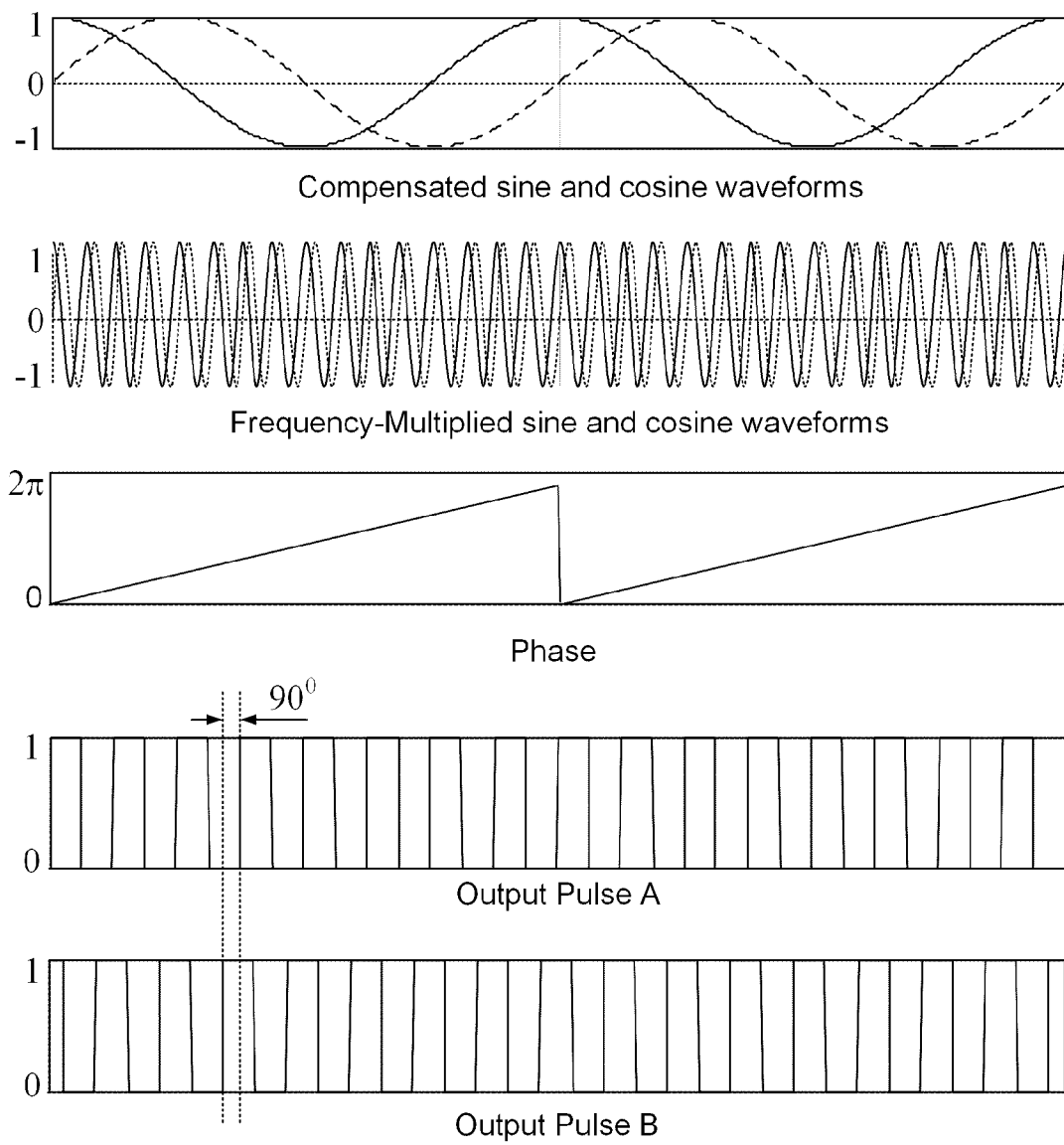
FIG. 11 is a waveform diagram illustrating the waveforms and phases of compensated sine and cosine waves, the waveforms of N-multiplied sine and cosine waves, and finally output square wave pulses in the apparatus for compensating output signals of a magnetic encoder using a digital PLL according to an embodiment of the present invention.

FIG. 11 is a waveform diagram illustrating the waveforms and phases of compensated sine and cosine waves, the waveforms of N-times-frequency-multiplied sine and cosine waves, and finally output square wave pulses in the apparatus for compensating output signals of a magnetic encoder using a digital PLL according to an embodiment of the present invention.

The sine and cosine waves are compensated to have a phase difference of 90 degrees with completely or almost no phase shift, amplitude difference, DC offset and noise distortion contained herein, and then the compensated sine and cosine waves are output. The estimated phase thereof periodically changes from 0 to $2\pi$.

Assuming that the look-up table stores the size values of 8-times-frequency-multiplied sine and cosine waves with respect to compensated sine and cosine waves, the waveform generation unit may output two pulses that rise and fall 8 times in one period of the compensated sine and cosine waves and have a phase difference of 90 degrees.

Since two pulses that rise and fall 8 times in one period of the compensated sine and cosine waves and have a phase difference of 90 degrees are output as described above, the apparatus for compensating output signals of a magnetic encoder according to the present invention may generate the quadrature pulse output of an optical encoder capable of providing a resolution corresponding to ¼ of a pulse period from a magnetic encoder using the above two pulses.

Figure 12:
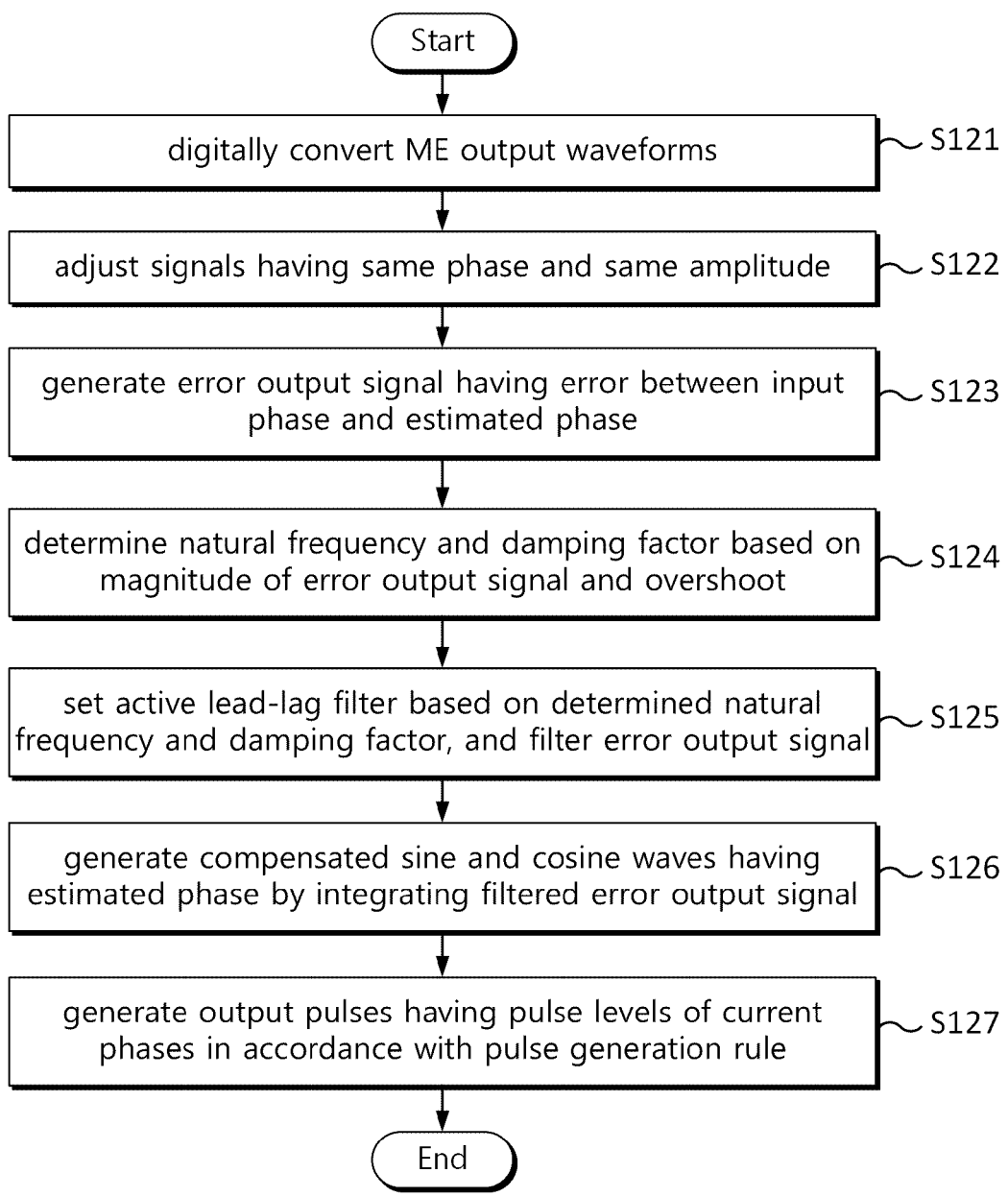
FIG. 12 is a flowchart illustrating a method of compensating output signals of a magnetic encoder using a digital PLL according to an embodiment of the present invention.

FIG. 12 is a flowchart illustrating a method of compensating output signals of a magnetic encoder using a digital PLL according to an embodiment of the present invention.

In the method of compensating output signals of a magnetic encoder according to this embodiment of the present invention, first, an ME output sine wave $u_{sin}$ and an ME output cosine wave $u_{cos}$ output from the magnetic encoder are digitally converted at step S121.

At step S122, two phase-compensated waveforms having the same phase are obtained by compensating a phase shift $\delta$ as much as a predetermined fixed phase value through the trigonometric function operations of the normalized waveforms from the digitally converted sine and cosine waves, and the amplitudes of the two phase-compensated waveforms are adjusted to be same, thereby generating an input sine wave $u_s$ and an input cosine wave $u_c$ having the same phase $\phi$ and the same amplitude A.

In other words, two phase-compensated waveforms having the same phase are obtained by compensating the phases of the digitized sine and cosine waves as much as respective predetermined fixed phase values through the trigonometric function operations of the normalized waveforms from the digitally converted sine and cosine waves, which are converted from the ME output sine wave $u_{sin}$ and the ME output cosine wave $u_{cos}$ output from the magnetic encoder ME, and the amplitudes of the two phase-compensated waveforms are adjusted to be same, thereby generating the input sine wave $u_s$ and the input cosine wave $u_c$ having the same phase $\phi$ and the same amplitude A.

More specifically, in an embodiment, the phase compensation may be realized with a waveform obtained by adding normalized waveforms and a waveform obtained by subtracting them.

In another embodiment, the phase compensation may be done as much as $(\pi+2\delta)/4$ for a normalized sine waveform and $(\pi-2\delta)/4$ for a normalized cosine waveform.

At step S123, an error output signal $u_e$ may be generated by performing the trigonometric function operations of the input sine wave $u_s$, the input cosine wave $u_c$, and a compensated sine wave $\sin \hat{\phi}$ and a compensated cosine wave $\cos \hat{\phi}$ having an estimated phase $\hat{\phi}$, so that the error output signal $u_e$ has a multiplying term of sin e, for example, as information about the phase error $e=\phi-\hat{\phi}$ between the phase $\phi$ of the input sine wave $u_s$ and the input cosine wave $u_c$ and the estimated phase $\hat{\phi}$ of the compensated sine wave and the compensated cosine wave.

In this case, when phase delay $\beta$ is not negligible as low frequency filtering for eliminating noise is performed on the input sine wave $u_s$ and the input cosine wave $u_c$, an error output signal $u_e$ may be generated by performing the trigonometric function operations of the filtered input sine wave $u_{sf}$ and the filtered input cosine wave $u_{cf}$ phase-delayed by the phase delay $\beta$ and the compensated sine wave $\sin \hat{\phi}$ and the compensated cosine wave $\cos \hat{\phi}$ adapted to have estimated phase $\hat{\phi}$, so that the error output signal $u_e$ has a multiplying term of sin e related to the phase error $e=\phi-\hat{\phi}$ between the phase $\phi$ of the input sine wave $u_s$ and the input cosine wave $u_c$ and the estimated phase $\hat{\phi}$ of the compensated sine wave and the compensated cosine wave, and a multiplying term of cos $\beta$ related to the phase delay $\beta$.

At step S124, a natural frequency $\omega_n$ and a damping factor $\zeta$ are determined based on the error output signal and overshoot.

More specifically, the natural frequency $\omega_n$ and the damping factor $\zeta$ are determined based on the magnitude of the error output signal $u_e$, the swing speed of a waveform, and the range of stability of the system.

At step S125, the filter transfer function of the active lead-lag filter is set based on the determined natural frequency $\omega_n$ and the damping factor $\zeta$, and the error output signal $u_e$ is filtered using the active lead-lag filter.

At step S126, a compensated signal including a compensated sine wave and a compensated cosine wave having the estimated phase $\hat{\phi}$ is generated by adding a signal, obtained by passing $f_{VCO}$ through an integrator, to a signal, obtained by passing a filtered error output signal $u_{ef}$ through an integrator having a gain of $K_{VCO}$.

At step S127, a phase index, corresponding to a current phase of the compensated sine and cosine waves, selected among M fractionized phase indices obtained from fractionizing a full range of phase within a single period of the compensated sine and cosine waves by M, is output, and two output pulses having a phase difference of 90 degrees are generated in accordance with a pulse generation rule found in a look-up table, in which pairs of size values of frequency-multiplied sin and cosine waves have been assigned to each of the phase indices, based on the phase index of the current phases.

More specifically, it may be possible to generate two output pulses having a phase difference of 90 degrees in accordance with a pulse generation rule using hysteresis having threshold values $V_{high}$ and $V_{low}$ at two different levels.

More specifically, when the level of the frequency-multiplied sine wave or cosine wave rises above a first threshold value $V_{high}$ that is relatively high, the pulse becomes a first state having a pulse level of 1, and remains in the first state until it enters a second state. In contrast, when the level of the frequency-multiplied sine wave or cosine wave falls below a second threshold value $V_{low}$ that is relatively low, the pulse becomes the second state having a pulse level of 0, and remains in the second state until it turns to the first state.

The output pulses that are generated as described above are quadrature pulse signals having a phase difference of 90 degrees.

The apparatus and method for compensating output signals of a magnetic encoder using a digital PLL according to at least one embodiment of the present invention have the advantage of dealing with faster rotational movement using a digital compensation circuit and the advantage of overcoming low frequency noise occurring in rotational movement at low revolutions per minute (RPM).

The apparatus and method for compensating output signals of a magnetic encoder using a digital PLL according to at least one embodiment of the present invention have the advantage of simultaneously processing a plurality of rotating objects and the advantage of providing an inexpensive solution based on application-specific integrated circuit (ASIC) design.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for compensating output signals of a magnetic encoder, comprising:
a pre-calibration unit configured to obtain two phase-compensated waveforms having an identical phase, through trigonometric function operations of normalized waveforms of digitally converted sine and cosine waves, which are converted from ME (magnetic encoder) output sine and cosine waves output from a magnetic encoder, and configured to adjust amplitudes of the two phase-compensated waveforms to be equal, thereby generating input sine and cosine waves having an identical phase and an identical amplitude;
an advanced phase detector configured to generate an error output signal through trigonometric function operations of the input sine wave, the input cosine wave, and a compensated sine wave and a compensated cosine wave having an estimated phase, so that the error output signal has a sine term of a phase error, between a phase, of the input sine wave or the input cosine wave, and the estimated phase, of the compensated sine wave or the compensated cosine wave, as a multiplying term;
a loop filter configured to set a filter transfer function of an active lead-lag filter based on a natural frequency and a damping factor determined based on the error output signal and overshoot, and to filter the error output signal using the active lead-lag filter;
a voltage controlled oscillator (VCO) configured to generate a compensated signal including the compensated sine and cosine waves having the estimated phase based on a signal obtained by passing the filtered error output signal through an integrator having a predetermined gain; and
a pulse generator configured to output a phase index, corresponding to a current phase of the compensated sine and cosine waves, selected among M fractionized phase indices obtained from fractionizing a full range of phase within a single period of the compensated sine and cosine waves by M, and configured to generate two output pulses having a phase difference of 90 degrees in accordance with a pulse generation rule found in a look-up table, based on the phase index of the current phases, the look-up table storing pairs of size values of frequency-multiplied sin and cosine waves assigned to each of the phase indices.

2. The apparatus of claim 1, wherein the pre-calibration unit is operated to generate input sine and cosine waveforms phase-compensated to have an identical phase through addition and subtraction of the normalized sine and cosine waveforms.

3. The apparatus of claim 1, wherein the pre-calibration unit is operated to generate input sine and cosine waveforms phase-compensated to have an identical phase by compensating the normalized sine waveform as much as $(\pi+2\delta)/4$ and the normalized cosine waveform as much as $(\pi-2\delta)/4$, wherein $\delta$ is a phase shift between the ME output sine and cosine waves.

4. The apparatus of claim 1, wherein the advanced phase detector is operated to perform low-frequency filtering on the input sine and cosine waves.

5. The apparatus of claim 4, wherein the advanced phase detector is operated to, in order to address phase delay attributable to the low-frequency filtering of the input sine and cosine waves, generate an error output signal by performing trigonometric function operations of the phase-delayed low-frequency filtered input and cosine waves and the compensated sine and cosine waves having an estimated phase, so that the error output signal has multiplying terms: a sine term of the phase error between the phase, of the input sine and cosine waves, and the estimated phase, of the compensated sine and cosine waves, and a cosine term, related to the phase delay.

6. The apparatus of claim 1, wherein the loop filter comprises:

a parameter adjustment unit configured to determine the natural frequency and the damping factor based on a magnitude of the error output signal and the overshoot; and an active lead-lag filter configured to filter the error output signal using the filter transfer function set based on the natural frequency and the damping factor.

7. The apparatus of claim 6, wherein the parameter adjustment unit is operated to determine the natural frequency and the damping factor, calculated based on a magnitude of the error output signal and a size of a derivative of the waveform, within a range of stability of a system.

8. The apparatus of claim 1, wherein the VCO is operated to generate a compensated signal including compensated sine and cosine waves having the estimated phase by adding a signal, obtained by passing an oscillation frequency through an integrator, to a signal, obtained by passing the filtered error output signal through an integrator having a predetermined gain.

9. The apparatus of claim 1, wherein the pulse generator comprises:

a phase index calculation unit configured to output a phase index, corresponding to a current phase of the compensated sine and cosine waves, selected among phase indices obtained from fractionizing a full range of phase within a single period of the compensated sine and cosine waves;

a look-up table configured to store pairs of size values of frequency-multiplied sin and cosine waves assigned to each of the phase indices; and a waveform generation unit configured to generate two output pulses having a phase difference of 90 degrees in accordance with a pulse generation rule, by which pulses are generated using hysteresis adapted to compare a change in size values of the frequency-multiplied-by-integer sine and cosine waves with threshold values at two different levels, the size values being found in the look-up table based on the phase index of the current phase.

10. The apparatus of claim 9, wherein:

the pulse generator generates output pulses each having any state of a first state having a pulse level of 1 and a second state having a pulse level of 0; and the pulse generation rule is a rule for determining the states of the output pulses in a manner that:

when a level of the frequency-multiplied sine or cosine wave rises above a first threshold value, which is relatively high, the pulse turns to a first state having the pulse level of 1, and then remains in the first state until it turns to a second state; and when the level of the frequency-multiplied sine or cosine wave falls below a second threshold value, which is relatively low, the pulse turns to the second state having the pulse level of 0, and then remains in the second state until it turns to the first state.

11. An apparatus for compensating output signals of a magnetic encoder, comprising:

a pre-calibration unit configured to obtain two phase-compensated waveforms having an identical phase through trigonometric function operations of normalized waveforms of digitally converted sine and cosine waves, which are converted from ME (magnetic encoder) output sine and cosine waves output from a magnetic encoder, and configured to adjust amplitudes of the two phase-compensated waveforms to an identical value, thereby generating input sine and cosine waves having the same phase and the same amplitude;

an advanced phase detector configured to generate an error output signal having information about a phase error between a phase of the input sine and cosine waves and an estimated phase of the compensated sine and cosine waves;

a loop filter configured to filter the error output signal using an active lead-lag filter having a filter transfer function set based on a natural frequency and a damping factor;

a VCO configured to generate the compensated sine and cosine waves having the estimated phase based on the filtered error output signal; and a pulse generator configured to generate two output pulses so as to have predetermined pulse levels and a phase difference of 90 degrees, corresponding to a current phase index, selected among multiple fractionized phase indices obtained from fractionizing a full range of phase within a single period of the compensated sine or cosine wave.

12. The apparatus of claim 11, wherein the pre-calibration unit generates a phase-compensated input sine waveform $u_{s1}$ and a phase-compensated input cosine waveform $u_{c1}$ having an identical phase by performing addition and subtraction of the normalized cosine waveform $u_{cN}$ and the normalized sine waveform $u_{sN}$, and obtains the input sine wave $u_s$ and input cosine wave $u_c$ by adjusting amplitudes $A_1$ and $A_2$ of the phase-compensated waveforms $u_{s1}$ and $u_{c1}$ so that $A = k_1 \cdot A_1 = k_2 \cdot A_2$, in accordance with the following Equations:

$$u_{s1} = u_{cN} + u_{sN}$$
$$= 2A_N \cos\frac{\pi + 2\delta}{4} \sin\left(\theta + \frac{\pi + 2\delta}{4}\right)$$
$$= A_1 \sin\varphi$$

$$u_{c1} = u_{cN} - u_{sN}$$
$$= 2A_N \sin\frac{\pi + 2\delta}{4} \cos\left(\theta + \frac{\pi + 2\delta}{4}\right)$$
$$= A_2 \cos\varphi$$

$$u_s = A \sin\phi$$

$$u_c = A \cos\phi$$

where $A_1$ and $A_2$ are amplitudes of the normalized waveforms, $\theta$ is a phase of the ME output sine wave, $\delta$ is a phase difference between the ME output sine and cosine waves, and $\phi$ is a phase of the input sine wave.

13. The apparatus of claim 5, wherein the advanced phase detector is operated to generate the error output signal in accordance with the following Equation:

$$u_0 = u_{sf}\cos\hat{\varphi} - u_{cf}\sin\hat{\varphi} = A\sin(e - \beta)$$
$$u_x = u_{sf}\sin\hat{\varphi} + u_{cf}\cos\hat{\varphi} = A\sin(e - \beta)$$
$$u_a = u_{a1} = u_s\sin\hat{\varphi} + u_c\cos\hat{\varphi} = A\cos e$$
$$u_t = u_{t1} = u_s u_{cf} - u_c u_{sf} = A^2 \sin\beta$$
$$u_{01} = (u_0^2 + u_x^2) \cdot u_0$$
$$u_{02} = u_a u_t = A^3 \cos e \sin\beta$$
$$u_e = u_{01} + u_{02}$$
$$= A^3(\sin(e - \beta) + \cos e \sin\beta)$$
$$= A^3 \cos\beta \sin e$$

where $u_s$ is the input sine wave, $u_c$ is the input cosine wave, $u_{sf}$ is the low-frequency filtered input sine wave, $u_{cf}$ is the low-frequency filtered input cosine wave, sin $\hat{\phi}$ and cos $\hat{\phi}$ are a sine wave and a cosine wave, respectively, that have an estimated phase $\hat{\phi}$ to be feed-backed, $\phi$ is a phase of the input sine wave, e is a phase error of $\phi-\hat{\phi}$, $\beta$ is phase delay that occurs upon low-frequency filtering, A is an amplitude of the input sine wave $u_s$ and the input cosine wave $u_c$, and $u_e$ is the error output signal.

14. The apparatus of claim 11, wherein the loop filter comprises:
 a parameter adjustment unit configured to determine the natural frequency $\omega_n$ and the damping factor $\zeta$ based on a magnitude of the error output signal and overshoot; and
 an active lead-lag filter configured to filter the error output signal using a filter transfer function set based on the natural frequency $\omega_n$ and the damping factor $\zeta$ and expressed by the following Equation:

$$F(s) = \omega_n^2 + (2\zeta\omega_n - \omega_n^2 - 1)\frac{s}{1+s}.$$

15. The apparatus of claim 14, wherein the parameter adjustment unit determines the natural frequency $\omega_n$ and the damping factor $\zeta$ in accordance with the following Equations:

$$\begin{cases} \omega_n = K_1 \cdot |u_e| + K_2 \left|\frac{\partial u_e}{\partial t}\right| \text{ with } \omega_n \in [\omega_{nmin}; \omega_{nmax}] \\ \zeta = K_3 \cdot |u_e| + K_4 \left|\frac{\partial u_e}{\partial t}\right| \text{ with } \zeta \in [\zeta_{min}; \zeta_{max}] \end{cases}$$

$$\left|\frac{\partial u_e}{\partial t}\right| \approx |u_{ek-2} - 4u_{ek-1} + 3u_{ek}|/2T_s$$

where $K_1$, $K_2$, $K_3$ and $K_4$ are limiting coefficients that limit the natural frequency $\omega_n$ and the damping factor $\zeta$ so that the natural frequency $\omega_n$ and the damping factor $\zeta$ are determined within a stable range between $[\omega_{n\ min}; \omega_{n\ max}]$ and $[\zeta_{min}; \zeta_{max}]$, $u_e$ is the error output signal, $u_{ek}$, $u_{ek-1}$ and $u_{ek-2}$ are a current sample, an immediately previous sample and a second previous sample of a discrete representation of $u_e$, and $T_s$ is a discrete sampling period.

16. The apparatus of claim 11, wherein the pulse generator is operated to generate two output pulses having a phase difference of 90 degrees in accordance with a pulse generation rule using hysteresis having threshold values at two different levels.

17. The apparatus of claim 16, wherein:
 the pulse generator generates output pulses each having any state of a first state having a pulse level of 1 and a second state having a pulse level of 0; and
 the pulse generation rule is a rule for determining the states of the output pulses in a manner that:
 when a level of the frequency-multiplied sine or cosine wave rises above a first threshold value, which is relatively high, the pulse turns to a first state having the pulse level of 1, and then remains in the first state until it turns to a second state; and when the level of the frequency-multiplied sine or cosine wave falls below a second threshold value, which is relatively low, the pulse turns to the second state having the pulse level of 0, and then remains in the second state until it turns to the first state;
 as expressed by the following Equations:

$$\begin{cases} 1^{st} \text{ state: } u_{in} \text{ rise } \& \ u_{in} \geq V_{high} \rightarrow \text{Pulse} = 1 \ \& \text{ hold till } 2^{nd} \text{ state} \\ 2^{nd} \text{ state: } u_{in} \text{ fall } \& \ u_{in} \leq V_{low} \rightarrow \text{Pulse} = 0 \ \& \text{ hold till } 1^{st} \text{ state.} \end{cases}$$

18. A method of compensating output signals of a magnetic encoder, comprising:
 obtaining two phase-compensated waveforms having an identical phase through trigonometric function operations of normalized waveforms of digitally converted sine and cosine waves which are converted from ME (magnetic encoder) output sine and cosine waves output from a magnetic encoder, and adjusting amplitudes of the two phase-compensated waveforms to an identical value, thereby generating input sine and cosine waves having the same phase and the same amplitude;
 generating an error output signal through trigonometric function operations of the input sine wave, the input cosine wave, and a compensated sine wave and a compensated cosine wave having an estimated phase, so that the error output signal has a sine term, as a multiplying term, of a phase error between a phase, of the input sine wave and the input cosine wave, and the estimated phase, of the compensated sine wave and the compensated cosine wave;
 setting a filter transfer function of an active lead-lag filter based on a natural frequency and a damping factor determined based on the error output signal and overshoot, and filtering the error output signal using the active lead-lag filter;
 generating a compensated signal including the compensated sine and cosine waves having the estimated phase based on a signal obtained by passing the filtered error output signal through an integrator having a predetermined gain; and
 outputting a phase index, corresponding to a current phase of the compensated sine and cosine waves, selected among multiple fractionized phase indices obtained from fractionizing a full range of phase within a single period of the compensated sine and cosine waves, and generating two output pulses having a phase difference of 90 degrees in accordance with a pulse generation rule found in a look-up table, based on the phase index of the current phases, the look-up table storing pairs of size values of frequency-multiplied sin and cosine waves assigned to each of the phase indices.

19. A non-transitory computer-readable storage medium having a program stored thereon, the program implementing the method of compensating output signals of a magnetic encoder set forth in claim 18.

* * * * *